(12) United States Patent  
Schlect (10) Patent No.: US 6,557,616 B2
(45) Date of Patent: May 6, 2003

(54) REAR-WINDOW ROLL-UP BLIND WITH SPRING-MOUNT ROLLERS

(75) Inventor: Werner P. Schlect, Vaihingen/Enz-Aurich (DE)

(73) Assignee: BOS GmbH & Co. KG (DE)

( * ) Notice: Subject to any disclaimer, the term of this patent is extended or adjusted under 35 U.S.C. 154(b) by 0 days.

(21) Appl. No.: 09/813,595

(22) Filed: Mar. 21, 2001

(65) Prior Publication Data

US 2001/0023746 A1 Sep. 27, 2001

(30) Foreign Application Priority Data

Mar. 24, 2000 (DE) .......................................... 100 14 760

(51) Int. Cl.[7] ................................................. B60J 3/02
(52) U.S. Cl. .................. 160/370.22; 160/265; 296/97.8
(58) Field of Search ........................... 160/370.22, 265, 160/310, 68; 296/97.7, 97.8, 97.4, 97.13

(56) References Cited

U.S. PATENT DOCUMENTS 4,758,041 A 7/1988 Labeur
4,836,263 A * 6/1989 Ament
5,291,934 A * 3/1994 Ouvrard et al.
5,615,729 A * 4/1997 Matsumoto et al.
5,752,560 A * 5/1998 Cherng
6,422,291 B1 * 7/2002 Brunnert et al.

FOREIGN PATENT DOCUMENTS

| DE | 3608927.3 A1 | 3/1986 |
| DE | 19835257 A1 | 2/2000 |
| DE | 19922586 A1 | 2/2000 |
| EP | 0221573 A | 5/1987 |
| WO | WO 00/07837 A | 2/2000 |

* cited by examiner

Primary Examiner—Blair M. Johnson
(74) Attorney, Agent, or Firm—Leydig, Voit & Mayer, Ltd.

(57) ABSTRACT

A rear windowpane roll-up blind is reeled out with the aid of actuating levers 9, 11. The actuating levers 9, 11 are the sole elements which carry the pull rod 13 of the roll-up blind 5. In order to prevent a damaging of the heating wires on the inside of the rear window pane 4, guide rollers 56 are rotatably supported on the outer ends of the pull rod 13. Mechanisms 42 70 are provided which allow the guide rollers 56 to yield under spring tension so that the force with which the rollers 56 are pressed on the pane 4 is held within a prescribed range regardless of installation and vehicle body tolerances.

21 Claims, 7 Drawing Sheets

REAR-WINDOW ROLL-UP BLIND WITH SPRING-MOUNT ROLLERS

FIELD OF THE INVENTION

The invention generally relates to window blinds for use in automobiles.

BACKGROUND OF THE INVENTION

A roll-up window blind for automobile rear window panes is know from DE-A-198 35 257. With this blind, the blind material is clamped and supported exclusively by means of two clamping levers. The levers are essentially rigid and resistant to bending. The levers are supported on pivots beside the winding shaft, the axis of which lies at a right angle to the axis of the winding shaft. The winding shaft is prestressed by a spring motor in the wind-up direction of the blind material, while the levers are swung upward with the aid of an electric motor. In the reeled-in position, the levers lie parallel to the winding shaft, while with the rolled-out blind they run likewise at a right angle to the winding shaft.

The clamping levers certainly are relatively stiff and also stiffly supported, but not so stiffly that they cannot start vibrating when normal jolting of the vehicle occurs. In order to avoid these vibrations, which would be troublesome especially in the reeling-out process and could lead to the pull rod striking on the rear window pane, the clamping levers are slanted in such manner that in the area of the end of the path range with the reeled-out blind the clamping levers press the pull rod against the pane with the help of guide skids. In the lower range, the levers and the pull rod move freely, which is forced by reason of the slant of the rear windowpane and the distance which the winding shaft must maintain from the curved rear windowpane.

In order to avoid damage to the heating wires on the inside of the rear windowpane, the pull rod is equipped with guide elements in the form of small rollers or small wheels. These small wheels during the reeling-in of the blind are pushed back behind the contour of the pull rod, so that when the blind is reeled-in, the outlet slot is nearly completely closed.

With the known blind, the guide rollers in the reeled-out state are rigidly supported. The pressure force applied by the guide rollers is produced by the particular installation geometry. Because of installation tolerances, non-inappreciable fluctuations can occur with respect to the pressing-on force.

OBJECTS AND SUMMARY OF THE INVENTION

Accordingly, in view of the foregoing, a general object of the present invention is to provide a roll-up window blind particularly for rear windowpanes of automobiles in which the pressing-on force applied by the guide elements is less strongly dependent on the installation tolerances than with known conventional blinds.

In the new roll-up window blind, means are provided which impart to the guide elements a yieldingness or movability in a direction perpendicular to the windowpane of the vehicle. In this manner, the pressing-on force with which the guide rollers lie against the pane can be kept relatively constant particularly, when, because of the installation tolerances, the position of the winding shaft deviates with the respect to the theoretical desired extent and/or when the plane in which the actuating elements swing encloses, with the rear windowpane, an angle different from the theoretical desired angle.

The guide elements can be constructed optionally as rollers or as slide skids.

The mechanism which can impart to the guide elements the desired yieldingness or movability in a direction perpendicular to the pane can be constructed in different ways and in different locations. One possibility lies in yieldingly or movably supporting the guide elements on the pull rod. For this purpose, a small housing in which there is movably accommodated the support for the guide element is expediently provided, for example in the form of a pusher, which is slidable approximately perpendicular with respect to the plane that is defined by the tensioned blind material.

Another possibility for achieving the desired yieldingness or movability comprises providing the bearing by which the particular clamping lever is borne in fixed position with a corresponding shape. Thus, a pivot with a collar that leads through a bore that is surrounded by a bearing surface or shoulder can be used as the bearing. The pivot can optionally be made so as to be fastened to the body or can be provided on the actuating element while the bore is present either in the clamping lever or in a frame which also bears or supports the winding shaft. With the aid of a preferably disk-form spring, a plate spring or shaft spring, for example, the contact surface is pressed against the collar of the pivot, a preferred positioning is hereby achieved. By reason of a corresponding dimensioning of the diameter of the pivot to the bore, a certain tilting possibility is produced, whereby the actuating element can be swung not only about the axis of the pivot, but also limitedly in a plane which contains the axis of the pivot.

Finally, as a third possibility, it is also conceivable to endow the actuating element itself with a certain flexibility, for example in the form of a band spring instead of a tube, which as compared with the band spring is very resistant to bending and would lead to undesirably great forces when the winding shaft is too close to the rear windowpane, or to forces that are much too small, should the distance be too great.

Depending on the embodiment, the winding shaft can be accommodated in a housing if the built-up solution is preferred, or it can be borne on a frame if the winding shaft, for example, is arranged underneath the hat rack or rear shelf through which the blind material and actuating elements emerge.

For driving the roll-up blind, the combination of a spring drive and an electric drive can be used. In such a situation, the spring drive functions as slave while the position of the pull rod is defined by the self-inhibiting electric motor. The electric motor can drive the winding shaft or the actuating elements, in which case the spring drive is coupled with the respective other component.

As actuating elements, the possibilities include simple levers or also toggle levers that are made up of two toggle lever pieces. In one case, a sliding movement is needed between the actuating element and the pull rod, while in the other case an additional hinge provides for instability, or also can be used as a means to generate the yieldingness or movability of the guide elements.

These and other features and advantages of the invention will be more readily apparent upon reading the following description of preferred exemplary embodiments of the invention and upon reference to the drawings wherein:

While the invention will be described and disclosed in connection with certain preferred embodiments and procedures, it is not intended to limit the invention to those embodiments. Rather it is intended to cover all such alternative embodiments and modifications as fall within the spirit and scope of the invention.

DETAILED DESCRIPTION OF EXEMPLARY EMBODIMENTS

Figure 1:
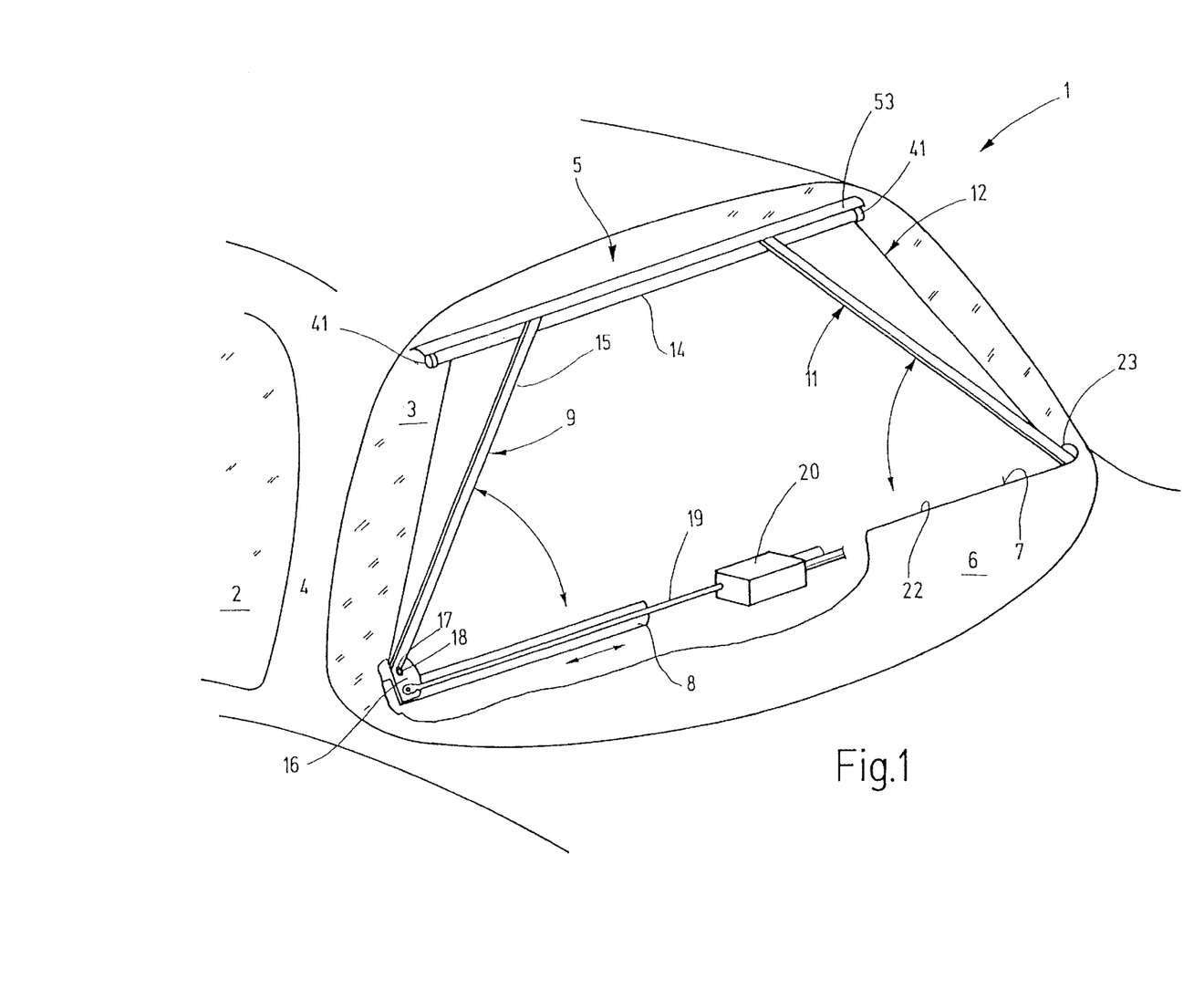
FIG. 1 is a schematic perspective view of an illustrative roll-up window blind according to the present invention arranged in a motor vehicle showing the blind in the reeled-out state.

FIG. 1 shows highly schematically the rear part of a motor vehicle 1. In the perspective representation, a left rear side window 2 can be seen as well as a rear window 3 with an installed, ordinarily curved windowpane 4. In front of the inside of the windowpane 4, a roll-up window blind 5 is present, which is shown in the reeled-out or extended state.

Furthermore, in FIG. 1 a hat deposit area 6 is shown in broken-open form, in which an outlet slot 7 extending over the width of the hat deposit area 6 is provided.

The roll-up window blind 5 includes a winding shaft 8, two actuating levers 9 and 11, a blind material 12 as well as a pull rod 13.

The winding shaft 8, which can be seen in the broken-open part of the rear shelf or hat rack 6, is rotatably supported underneath the hat deposit area 6 with bearing arrangements (not shown). A spring motor is located in the interior of the winding shaft 8 which steadily tensions the winding shaft 8 in the direction corresponding to a winding-up of the blind material 12. The winding shaft 8 lies horizontally about underneath and parallel to the straight outlet slot 7.

The blind material 12 consists of a smooth perforated plastic foil, which is fastened with one edge to the winding shaft 8 and with its other edge 14, parallel thereto, to the pull rod 13.

The two actuating levers 9 and 11 are in mirror-image to each other, so that the description for the actuating lever 9 holds analogously also for the actuating lever 11. The actuating lever 9 is a two-armed lever with a lever portion 15 as well as a lever portion 16. At the transition point between the two lever portions 15 and 16, a bearing bore 17 is present, with the aid of which the actuating lever 9 is pivotally supported on a bearing pivot 18. The bearing pivot 18 is fastened to the underside of the broken-away part of the hat deposit area 6 beside the outlet slot 7. The alignment of the bearing pivot 18 is such that the lever section 9 moves in a plane which lies approximately parallel to the plane defined by the windowpane 4.

The actuating lever 9 can be pivoted out of a position in which the lever portion 15 extends about parallel to the winding shaft 8, into a position in which it lies about parallel to the lateral boundary edges of the rear window 3.

In order to move the actuating lever 9 back and forth between these two end positions, its lower lever portion 16 is connected over an actuating rod 19 with a drive motor 20. The actuating rod lies parallel to the winding shaft 8 and is likewise underneath the hat deposit area 6, together with the drive arrangement 20. The actuating lever 11 is constructed in mirror image and is moved over a corresponding actuating rod synchronously in opposite direction to the actuating lever 9.

In the mounted state, the two lever portions 15 of the actuating levers 9 and 11, as shown, extend upward through the outlet slot 7, while in the reeled-in state they largely disappear under the hat deposit area 6.

The outlet slot 7 is bounded by two parallel slot edges 22 and 23 which are spaced from each other such that the two actuating levers 9 and 11 can pass through unimpeded so that the blind material 12 can be drawn out. When the roll-up blind is reeled in, the outlet slot 7 is covered by the pull rod 13.

Figure 2:
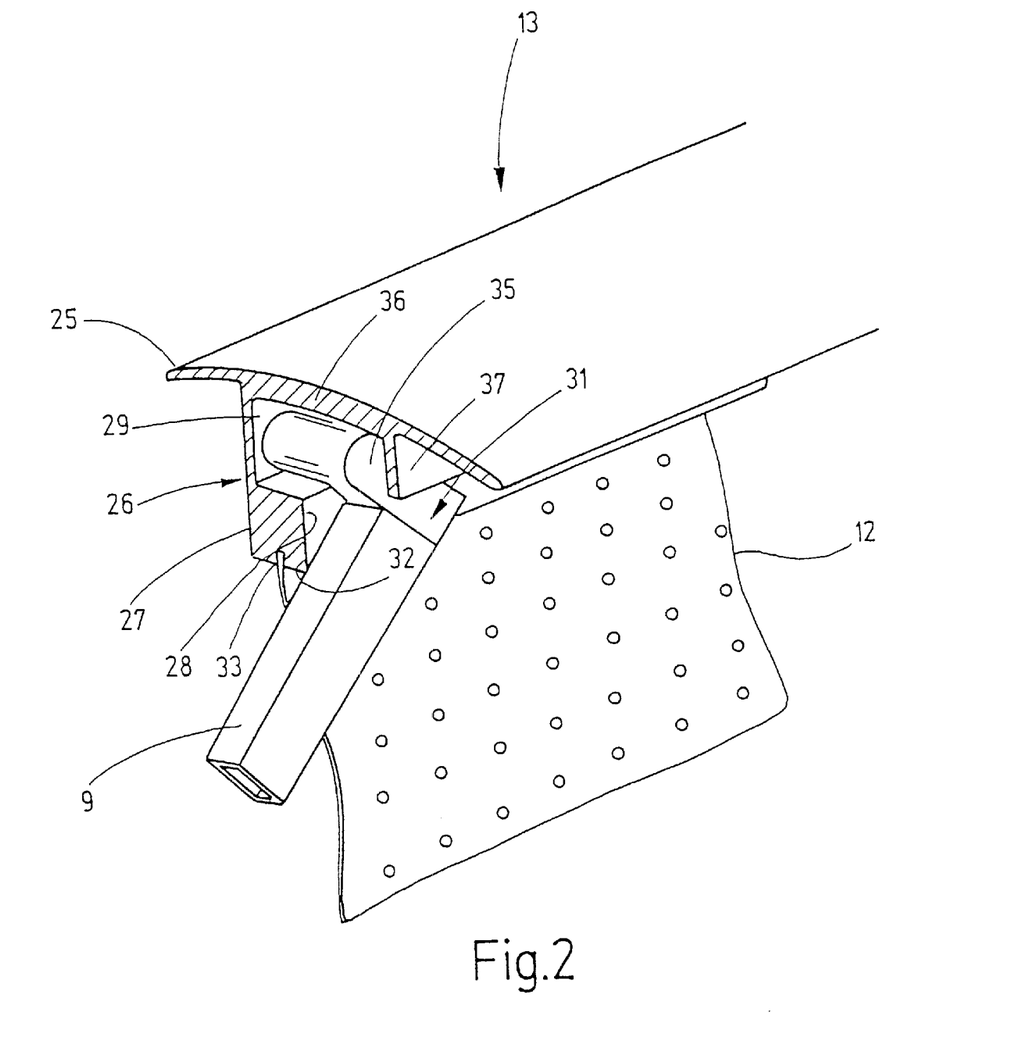
FIG. 2 is an enlarged perspective view of the free end of one of the actuating levers of the roll-up window blind of FIG. 1 which shows the actuating lever sliding into the pull rod.

The connection of the actuating lever 9 with the pull rod 13, as well its profile, can be seen in FIG. 2. In the illustrated embodiment, the profile of the pull rod 13 comprises a relatively narrow strip 25 that is curved cylindrically slightly upward and of a downward-leading saddle piece 26. Therefore, the pull rod has a roughly T-shaped cross sectional shape which is unaltered over the length of the pull rod 13. The width of the strip 25 is such that when the roll-up window blind 5 is reeled in, the strip covers the outlet slot 23, whereas the saddle piece 26 plunges downward through the outlet slot 7. The axis of curvature of the cover strip 25 lies parallel to the lengthwise extent of the pull rod 13. The saddle piece 26 is bounded by two parallel side surfaces 27 and 28 which stand vertically on the underside of the strip 25.

Proceeding from the side surface 28, a groove 29 having a rectangular cross section, which extends into the vicinity of the wall side 27, leads into the saddle piece 26. This groove 29 likewise extends the entire length of the pull rod 13 and serves as a guide groove for a head end 31 of the actuating lever 9.

The head end 31 is a molded piece that is multiply bent-off, which with a pivot (not further recognizable) plugs in the tubular actuating lever 9. Proceeding from the free end of the lever 9, the head piece 31 forms an upward-standing extension 35, which goes over into a cylindrical pivot 36. The cylindrical pivot 36 extends at a right angle to the long axis of the lever portion 15, and is offset somewhat laterally with respect to the lever portion.

So that the pivot 36 will not inadvertently come free from the groove 29 during the actuation of the roll-up window blind 5, a downward-extending strip 37 is arranged spaced at a distance from the groove, which is molded on the underside of the strip 25. The distance of the strip from the side surface 28 corresponds to the thickness of the continuation 35 as measured in this direction. The actuating lever 11 is also guided in groove 29, in a like but mirror-image manner. In the event that, by reason of their proportions, the actuating levers 9 and 11 should collide in the groove 29 in their reeled-in state, it is also possible to use two grooves 29 lying one over the other, in which case each groove is provided for one of the actuating levers.

So that the pull rod 13 pressed against the inside of the windowpane 4 will not damage the heating wires as it moves between the reeled in and reeled out positions, the rod is provided with guide elements 41 in the proximity of its two ends. The guide elements 41 are movably supported and project at a defined distance of the pull rod 13 from the outlet slot 7 over the edge of the head strip 25 of the pull rod 13 adjacent to the rear window pane 4, while in the other position they are pressed back with respect to its outer contour.

The guide elements 41 are provided with the mechanisms 42 which impart to them in every intermediate position besides the mechanical end positions, a movability in a direction at least approximately perpendicular to the rear window pane 4. These mechanisms also include a spring arrangement by means of which the guide elements 41 are prestressed in the direction toward the rear window pane 4.

In detail the construction is as follows: The guide elements 41 are constructed in mirror image at the two ends of the head strip 25, for which reason the description is restricted to one of the guide elements 41. The explanation holds analogously also for the other guide element 41 that in each case is at the other end. The already aforementioned mechanisms 42 which serve to impart the requisite yieldingness or movability to the guide element 41 comprise a housing 43 obtained by plastic injection and fastened to the head strip 25, which is shown in section in FIG. 5. The housing 43 is composed of two side walls 44 and 45 running parallel and spaced from one another, as well as two cross walls 46 and 47 running transversely that are connected in one piece therewith. A guide channel 48 having a rectangular cross section and which extends from a front face side 49 of the housing to a rear face side 51 is bounded by the side walls 44, 45 as well as the transverse walls 46, 47.

Figure 5:
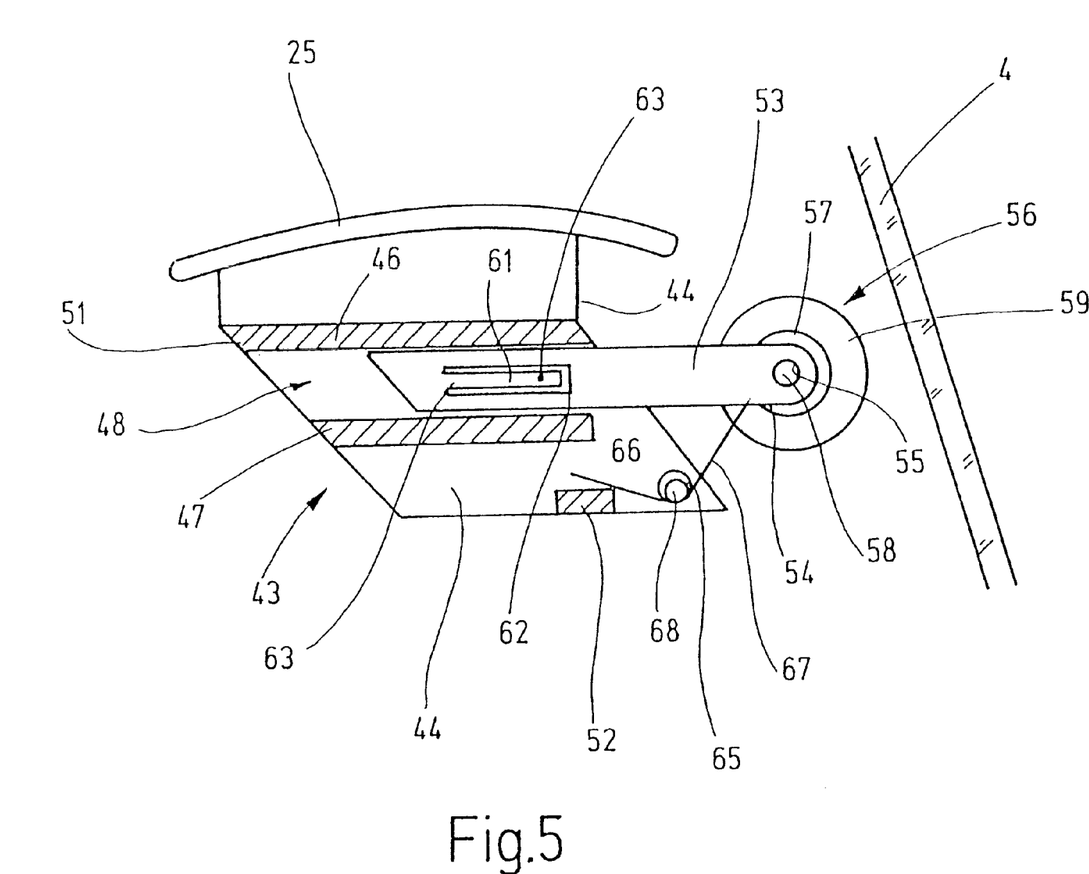
FIG. 5 is a side sectional view of the guide element of FIG. 4.

With the side walls 44, 45, the housing 43 is fastened to the underside of the head strip 25. The arrangement is made in such manner that the guide channel 48 runs at a distance from the underside of the head strip 25 which can be understood from the functional description given further below.

Furthermore, the side walls 44 likewise extend for a distance underneath the lower transverse wall 47 and at the lower end of the lengthened zone they are additionally joined with one another over a narrow cross step 52.

In the guide channel 48, which runs about parallel to the chord extent of the cylindrically upward exploded head strip 25, a pusher 53 is inserted, the outer measurements of which are adapted to the guide channel 48. The pusher 53 is tubular and on its end adjacent to the rear window pane 4 terminates in two parallel legs 54 of which, because of the drawing only the leg 54 facing the viewer can be seen. Bores 55 are contained in the two legs 54 that are aligned with one another and which serve as an axial bore for the roller 56.

The roller 56 consists of a hub 57 with journals 58 formed by injection molding on both sides, on which a solid rubber tire 59 is placed. In order to prevent the tire 59 from scraping on the inside of the leg 54, the axial journal can have a greater diameter between the inside of the leg 54 and the adjacent face side of the hub 57, so that thereby a spacer results which simultaneously provides that the hub 57 with the tire 59 is centered between the legs 54. The axis of rotation of the roller 56 lies about parallel to the rear window pane 4, so that it can roll off on the inside of the rear window pane 4.

In the area of the guide channel 48, a spring tongue 61 is molded in each case on the side walls of the pusher 53, as can be seen on the side of the pusher 53 facing the observer. The spring tongue 61 extends essentially in a rectangular recess 62. It is connected as one piece with the guide pusher 53, at the end of recess 62 that is away from the guide roll 56. At a distance from its free end, the tongue 61 has an edge 63 in such manner that there results a rectangular step, which with respect to the guide pusher 53 points outward and in the direction of the guide roller 56.

A further tongue 61, constructed in the same manner but in mirror image, is present on the non-visible side of the guide pusher 53. These two tongues 61 serve as movement stops for the guide pusher 53 and cooperate with rectangular openings 64 which are contained in the two side walls 44 and 45, at the level of the tongues 61.

Figure 4:
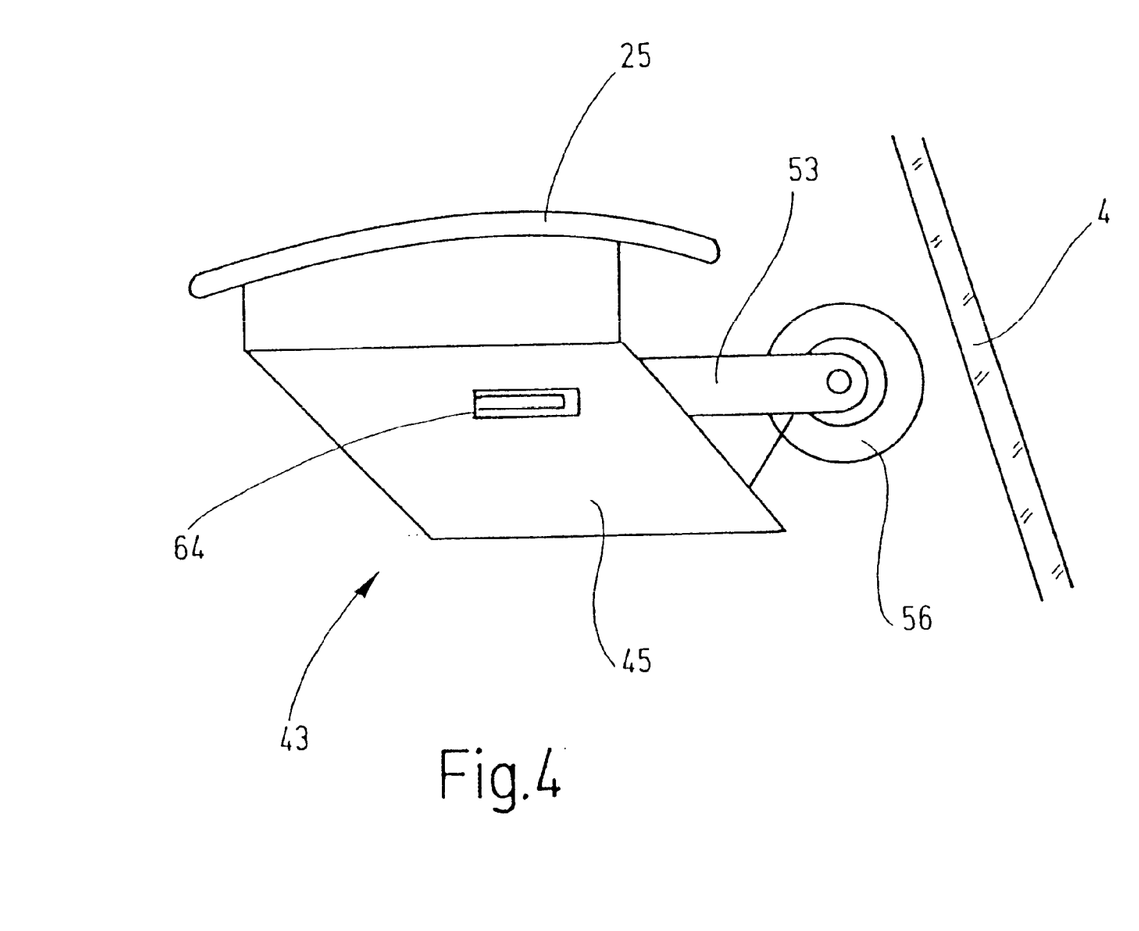
FIG. 4 is a side elevation view of the guide element and associated housing of FIG. 3 shortly before the guide element touches the pane.

In order to thrust the guide pusher 53 together with guide roller 56 supported on it in the direction toward the rear window pane 4, two leg springs 65 are provided, of which, because of the cut-off representation in FIG. 4 only one is to be seen. The leg spring 65 consists of a spirally wound wire with two leg ends 66 and 67. The leg spring is seated with its wound part on a pivot 68 which is constructed in one piece on the inside of the side wall 44 below and, namely, between the step 52 and the front face side 49 of the housing. A further pivot 68 is located on the inside of the side wall 45 and is aligned with the pivot 68. On it, too, a leg spring is seated which is constructed in exactly the same manner as the leg spring 65.

The leg spring 65 is supported as shown with the leg 66 on the step 52, while the other leg 67 lies against the axial pivot 58 of the guide roller 56. As such, the leg 67 extends into the gap between the guide roller 56 and the inside of the bearing leg 54.

The two leg springs 65 tend to draw the guide pusher 53 to the face side 59 out of the guide channel 48. This movement stroke is limited when the step 63 strikes on the front edge of the rectangular recess 64. In the practical embodiment the possible stroke amounts to approximately 12 mm. By reason of the special construction of the leg spring 65 and the relative position of the pivot 68 to the fully thrust-out guide roller 56, a negative spring characteristic curve is produced.

The thrust force with which the guide roller is thrust in the direction onto the rear window pane 4 is greatest when the leg 65 lies about at a right angle to the lengthwise extent of the guide pusher 53. The thrust force becomes less when, proceeding from this position the guide pusher 53 is further thrust in. The negative spring characteristic curve prevents an unnecessarily great contact pressure force against the edge 22 of the outlet slot 7 when the rear roll-up window blind 5 is reeled in.

Figure 3:
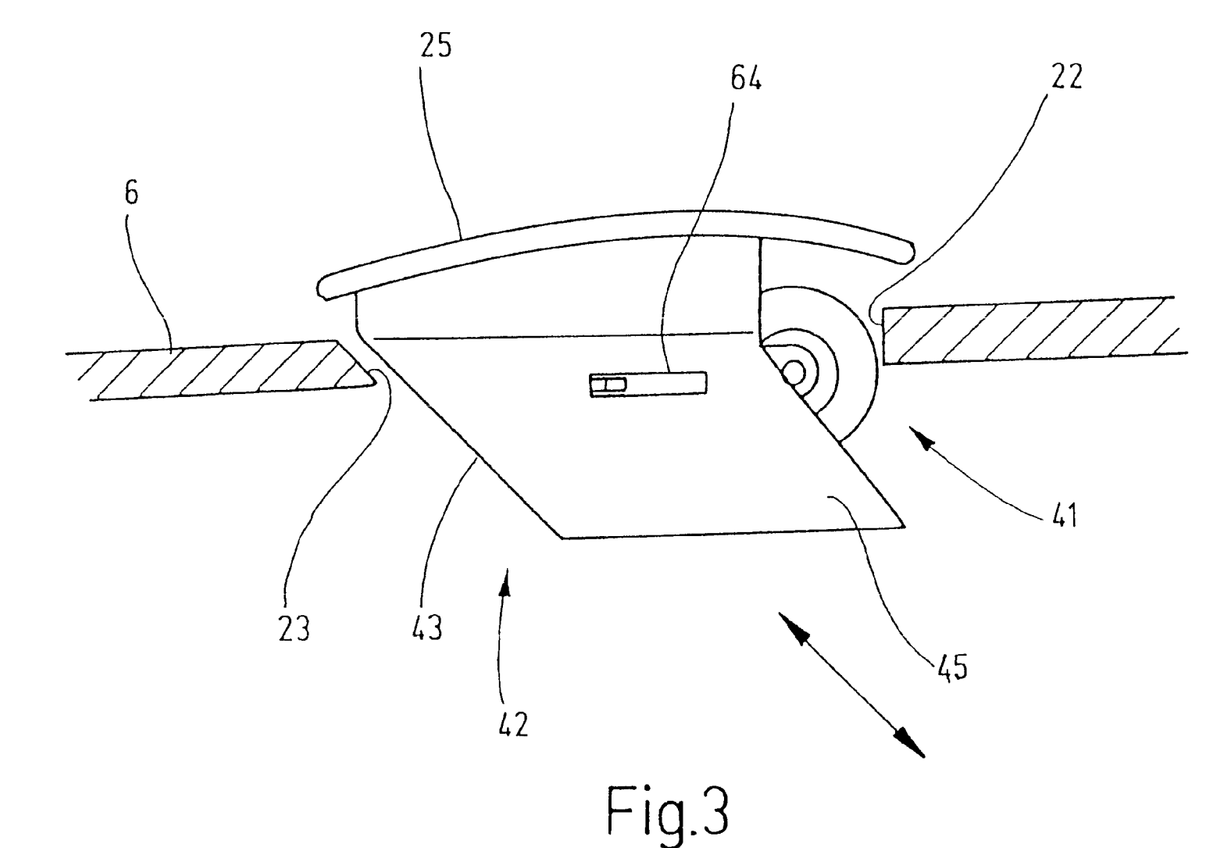
FIG. 3 is a highly schematic side elevation view of one of the guide elements and its associated housing at the moment it emerges from the outlet slot.

It is obvious that the formation of the side walls 44, 45, which in the illustrated embodiment are about of parallelogram form, is governed according to the special installation relations. The edges on the front and the rear face side 49 and 51 lie about parallel to the movement plane in which the pull rod 13 distances itself from the outlet slot 7. Furthermore, the two cross walls 46 and 47 can recede or be recessed in V-form on the front face side 59 opposite the front face side 49, so that the guide roller 56 can be thrust back as far as possible into the housing 43, as can be seen in FIG. 3.

In detail, the illustrated embodiment functions as follows:

In the reeled-in state of the rear window pane roll-up blind 5, the head strip 25 of the pull rod 13 rests on the upper side of the hat deposit area 6 on both sides of the outlet slot 7. The outlet slot 7 is in this manner completely covered by the head strip 25. In this operating position, the guide roller 56 lies against the edge 22 of the outlet slot adjacent to the rear window pane 4 and, namely, either directly on the slot edge 22 itself or on an extension extending for a distance downward, according to how the relation between the thickness of the hat deposit area 6 and the distance of the guide roller 56 to the underside of the heat strip 25 appears. With the aid of the two leg springs 65 the guide roller 56 is held in engagement to the hat deposit area 6. In the completely reeled-in position, furthermore, the two actuating levers 9 and 11 lie parallel to the winding shaft underneath the outlet slot 7. Only the head strip 23 of the rear window pane roll-up blind is visible from the outside.

If proceeding from this operating position, the rear roll-up window blind 5 is to be reeled out or unwound, the electric motor 20 is started, which thereby over a gear moves the two actuating rods 19 toward one another. Hereby, the clamping lever 9, with respect to the representation in FIG. 1, is pivoted counterclockwise and the actuating lever 11 is pivoted clockwise about the particular bearing pivot 18. The actuating levers 9 and 11 unfold from the outlet slot 7 and raise the pull rod 13. In this movement, the guide roller 26 runs upward on the edge 22 and, as soon as it has lost contact with the edge 22, travels out completely into the position shown in FIGS. 4 and 5.

The two guide rollers 56 retain this position at the ends of the pull rod 13 over a considerable interval of the movement stroke of the pull rod 13. The plane in which the actuating levers 9 and 11 moves stands steeper than the corresponding slope of the rear window pane 4, because the winding shaft must be present at a distance from the rear window pane 4. Only in the upper end of the lifting range do the guide rollers 56 come in contact with the inside of the rear window pane 4, so that there comes about a support of the pull rod 13 opposite the inside of the rear window pane 4. Thereby, swinging movements of the guide rollers or the guide rollers hitting on the rear window pane by reasons of jolting of the vehicle is prevented.

The force that is active between the pull rod 13 and the rear window pane 4 is produced, in the inventive embodiment, exclusively on the basis of the hardness of the leg springs 65.

Unavoidable installation and car-body tolerances are compensated for by the movement stroke that the roller 56 under spring suspension can execute, the press-on force of the guide rollers 56 being virtually constant. It must be merely great enough to suppress the excessive vibrational movements of the actuating levers 9 and 11 in the vehicle longitudinal direction, so that the pull rod 13 can find the receiving pockets present on the upper edge of the rear window pane 4.

In the reeling-in of the rear window pane roll-up blind 5, after about 10% to 20% of the movement stroke, the guide rollers 56 lose contact with the inside of the rear window pane 4 and again return into the position according to FIGS. 4 and 5. At the end of the reeling-in movement, the guide roller 56 runs onto the edge 23 of the outlet slot 7 and is pressed back against the action of the leg spring 65.

In the completely reeled-in state, the guide pusher 53 stands, with reference to the fixture, at the left end of its movement stroke. In this position, the two legs 66 and 67 lie at an acute angle to one another, so that they still generate only a very small ejecting force on the slot edge 22.

Figure 6:
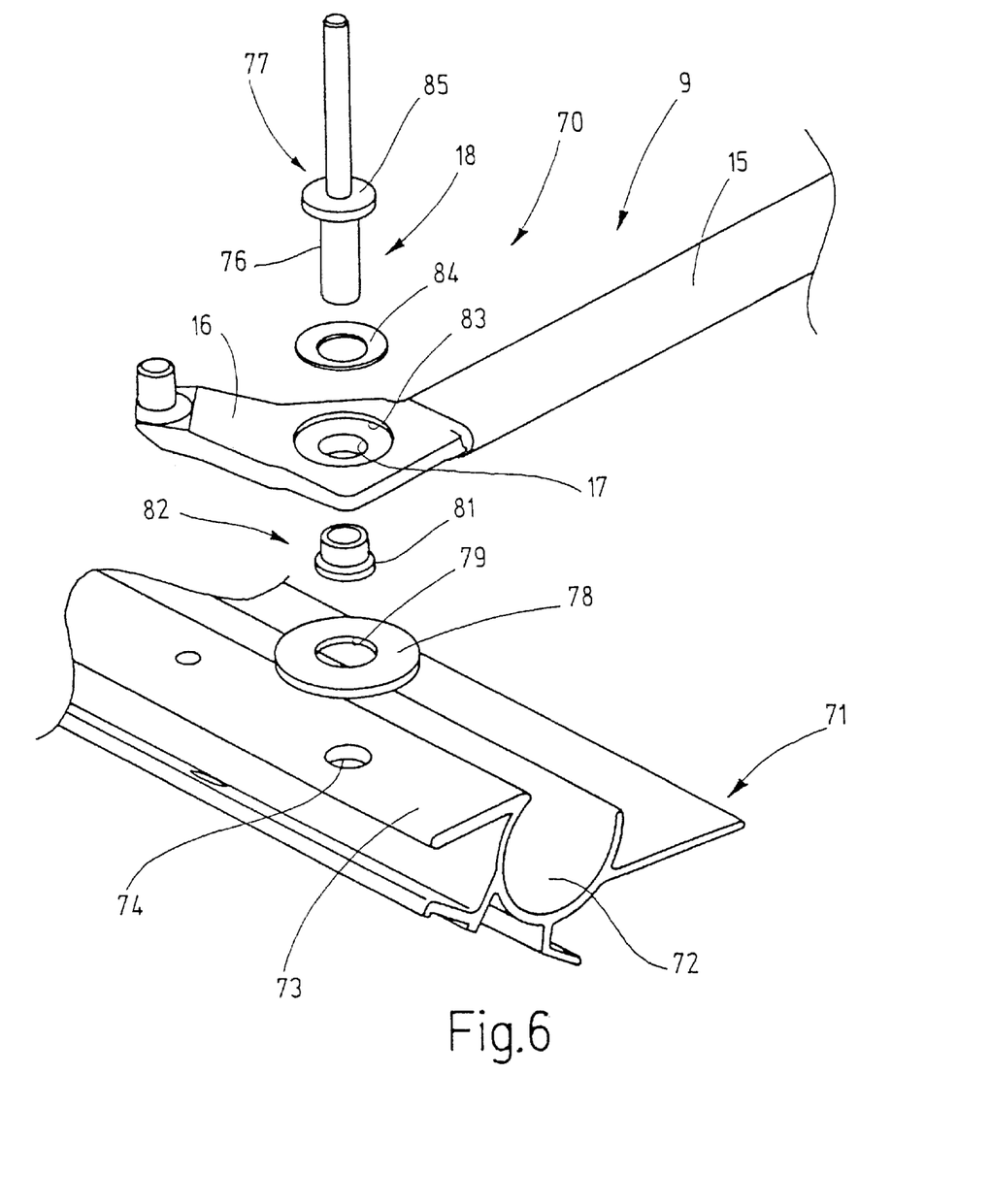
FIG. 6 is an exploded perspective view of the base point side-bearing of one of the actuating levers for the roll-up blind.
Figure 7:
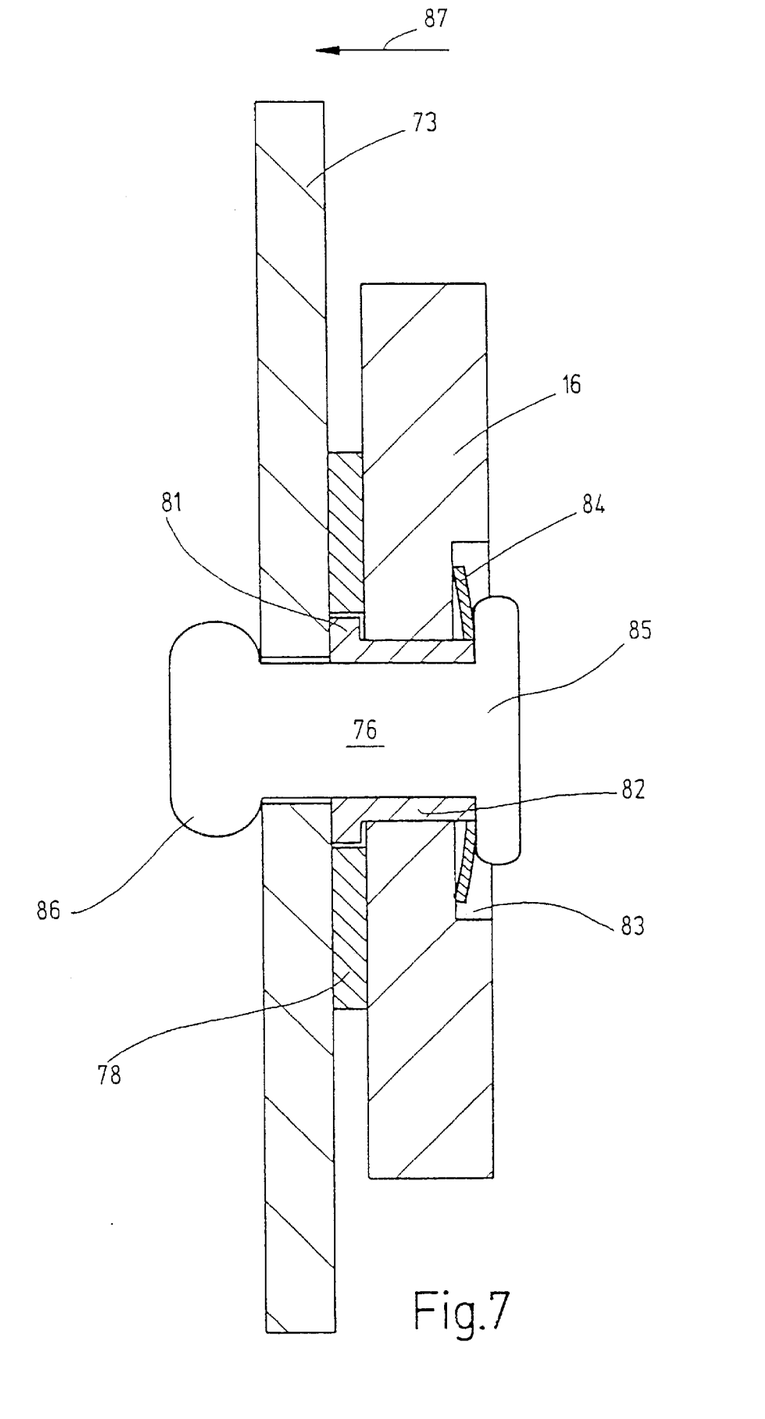
FIG. 7 is a side view of the bearing of FIG. 6 in the mounted state.

Another possibility for obtaining the desired yieldingness or movability lies in the manner in which the actuating lever 9 or 11 is borne. A bearing 70 suited for this is shown in FIGS. 6 and 7.

An extrusion press profile 71 which serves as a frame, or housing for the bearing of the winding shaft is provided with a corresponding continuously profiled groove 72 for the winding shaft. Following upon this groove, the profile 71 goes over into a straight strip 73, which contains a bearing bore 74 in the vicinity of each of its ends. Because of the broken-off representation, in FIG. 6 only one of the two bores can be seen. The bearing pivot 18 is plugged in the bearing bore 74 which is formed by a shaft 76 of the blind rivet 77.

In order to permit a tilting of the clamping lever 9 transversely to its proper swing plane, a shim 78 lies between the rear side of the clamping lever and the front side of the strip 73. The bore 79 of the shim is such that it can receive a collar 81 of a collar sleeve 82. The axial thickness of the collar 81 is somewhat less than the thickness of the shim 78.

The bearing bore 17 in the actuating lever 9 is surrounded by a sunken portion 83 which serves as reception space for a plate spring 84.

The assembly of the illustrated arrangement can be as follows:

With the convex side forward, the plate spring 84 is thrust onto the shaft 76 of the blind rivet 77 until it bears on the rivet head 85. This arrangement is introduced from the side away from the profile 71, into the bearing bore 17. From the rear, the collar sleeve 82 is slid onto the shaft 76. Thereupon, the shim 78 is thrust on over the collar 81. Finally, the shaft 76 with the components threaded thereon is thrust into the bore 74. The blind rivet 77 is riveted in a known manner with formation of a closing head 86 to the rear side of the strip 73. In the riveting process, the rivet head 85 is drawn against the free face side of the collar sleeve 82, as can be seen in FIG. 7.

The degree to which the plate spring 84 is stressed is produced by the axial gap between the bottom of the sunken portion 83 and the adjacent shoulder surface of the rivet head 85. This distance is determined by the length of the collar sleeve 82, which is supported with its collar 81 on the front side of the strip 73 when the closing head 86 is generated. As FIG. 7 makes evident, because of the thickness of the shim 78, the actuating lever 9 has a slight axial play with respect to the collar 81.

It is obvious that the strength of the rivet 77 must be correspondingly high, for which reason it is in the form of a steel rivet.

The illustrated arrangement functions as follows:

The actuating lever 9 is pressed against the shim 78 by the plate spring 84, in place of which a spring washer can also be used. In the reeling-out of the blind, therefore, the actuating lever 9 will move in a plane which is parallel to the plane which defines the front side of the strip 73. As soon the rigidly borne guide rollers come into engagement with the plate as in the upper range of the reeling-out stroke, the clamping lever 9 is pressed back, as shown by an arrow 87 in FIG. 7. In the process, the clamping lever executes a tilting movement about the upper edge of the shim 78, while the plate spring 84 tends to act against this tilting movement. With corresponding dimensioning of the hardness of the plate spring 84, the prestressing of which is dimensioned on the basis of the installation and of the diameter of the shim 78, a desired yieldingness or movability can be achieved.

In this tilting movement, the above-lying area of the edge of the shim plate 78 acts as tilting axis. During the tilting, the rear side lifts off from the remaining surface of the shim plate 78.

As rigidly borne guide rollers there also can be used guide rollers such as the guide rollers of DE-A-198 35 257 cited in the introduction to specification, which can be retracted behind the clearance space profile of the head strip 25, but are rigidly supported in the reeled-out state.

Finally, the desired yieldingness or movability can also be achieved if the upper lever arm 15 of the clamping lever 9 is given a certain flexibility in a direction perpendicular to the clamping plane of the blind material 12. For example, if the upper arm of the clamping lever is executed in its entirety or in a section as a leaf spring which is rigid in a direction parallel to the clamping plane of the blind material 12, and is yielding perpendicularly thereto.

The invention was explained in connection with one-piece actuating levers 9 and 11. It is apparent, however, that instead of one-piece actuating levers 9 and 11, toggle levers can also be used, in which case the lower toggle lever piece is articulated either as shown in FIG. 1 or as is shown in FIGS. 6 and 7, while the upper toggle lever piece is connected over a hinge with the pull rod 13.

A rear windowpane roll-up blind is reeled out with the aid of actuating levers 9, 11. The actuating levers 9, 11 are the sole elements which carry the pull rod 13 of the roll-up blind 5. In order to prevent a damaging of the heating wires on the inside of the rear window pane 4, guide rollers 56 as rotatably supported on the outer ends of the pull rod 13. Mechanisms 42 70 are provided which allow the guide rollers 56 to yield under spring tension so that the force with which the rollers 56 are pressed on the pane 4 is held within a prescribed range regardless of installation and vehicle body tolerances.

What is claimed is:

1. A roll-up window blind for window panes of motor vehicles comprising:
   a rotatable winding shaft;
   a blind material having parallel first and second edges with the first end being fastened to the winding shaft, the blind material being movable between a retracted and an extended position;
   a first drive mechanism for rotating the winding shaft in a direction corresponding to moving the blind material toward the retracted position;
   a pull rod fastened to the second edge of the blind material;
   an actuating element supported by a bearing and having an associated second drive arrangement for moving the actuating element from a first position, in which the pull rod is adjacent the winding shaft to a second position, in which the pull rod is farther away from the winding shaft than in the first position;
   two guide elements which are spaced from each other and are mounted on the pull rod in order to guide the pull rod on the window pane as the blind material moves between the retracted and extended positions; and
   a yield mechanism for each guide element which allows the associated guide element to yield in a direction perpendicular with respect to the window pane wherein each yield mechanism includes a mounting assembly which supports the respective guide element on the pull rod.

2. A roll-up window blind according to claim 1, wherein the guide elements comprise rotatable rollers which are rotatable with respect to an axis which extends at least approximately parallel to a plane which is divided by the window pane and extends parallel to the pull rod.

3. A roll-up window blind according to claim 1, wherein the mounting assembly includes a housing which is rigidly secured to the pull rod.

4. A roll-up window blind according to claim 3, wherein a carrier is movably supported in the housing on which the guide element is seated.

5. A roll-up window blind according to claim 4, wherein the carrier comprises a pusher which is movably guided in the housing and is prestressed by a spring into a position advanced onto the window pane.

6. A roll-up window blind according to claim 5, wherein the spring is a leg spring.

7. A roll-up window blind according to claim 1, wherein the winding shaft is supported in a housing which has an outlet slot for the blind material.

8. A roll-up window blind according to claim 1, wherein the winding shaft is supported in a frame which can be fastened to a shelf area of the motor vehicle, which has an outlet slot.

9. A roll-up window blind according to claim 1, wherein one of the first and second drive arrangements is a spring drive.

10. A roll-up window blind according to claim 1, wherein the pull rod and the outlet slot have corresponding configurations such that the pull rod with the blind material in the reeled-in position closes the outlet slot.

11. A roll-up window blind according to claim 1, further including two actuating elements comprising clamping levers pivotally supported beside the winding shaft, free ends of the actuating elements cooperating with the pull rod and being pivotable out of a position in which they extend about parallel to that winding shaft into a position in which they extend about at a right angle to the winding shaft.

12. A roll-up window blind according to claim 1, further including two actuating elements comprising two toggle levers pivotally supported beside the winding shaft, respective ends of the toggle levers cooperating with the pull rod and being pivotable out of a position in which in a first position they extend about parallel to the winding shaft, into a second position in which they extend about at a right angle to the winding shaft.

13. A roll-up window blind for window panes of motor vehicles comprising:
   a rotatable winding shaft;
   a blind material having parallel first and second edges with the first end being fastened to the winding shaft, the blind material being movable between a retracted and an extended position;
   a first drive mechanism for rotating the winding shaft in a direction corresponding to moving the blind material toward the retracted position;
   a pull rod fastened to the second edge of the blind material;
   an actuating element supported by a bearing and having an associated second drive arrangement for moving the actuating element from a first position, in which the pull rod is adjacent the winding shaft to a second position, in which the pull rod is farther away from the winding shaft than in the first position;
   two guide elements which are spaced from each other and are mounted on the pull rod in order to guide the pull rod on the window pane as the blind material moves between the retracted and extended positions; and
   a yield mechanism for each guide element which allows the associated guide element to yield in a direction perpendicular with respect to the window pane wherein each yield mechanism includes the bearing for rotatably supporting the actuating element.

14. A roll-up window blind according to claim 13, wherein the bearing comprises a pivot, a bearing collar and a bore that is surrounded by a bearing surface through which the pivot extends, the pivot having play in the bore and that through a spring arrangement the actuating element is pre-stressed against the bearing collar in a direction that will make the actuating element and the bearing collar lie flat upon each other.

15. A roll-up window blind according to claim 13, wherein the guide elements comprise rotatable rollers which are rotatable with respect to an axis which extends at least approximately parallel to a plane which is divided by the window pane and extends parallel to the pull rod.

16. A roll-up window blind according to claim 13, wherein the winding shaft is supported in a housing which has an outlet slot for the blind material.

17. A roll-up window blind according to claim 13, wherein the winding shaft is supported in a frame which can be fastened to a shelf area of the motor vehicle, which has an outlet slot.

18. A roll-up window blind according to claim 13, wherein one of the first and second drive arrangements is a spring drive.

19. A roll-up window blind according to claim 13, wherein the pull rod and the outlet slot have corresponding configurations such that the pull rod with the blind material in the reeled-in position closes the outlet slot.

20. A roll-up window blind according to claim 13, further including two actuating elements comprising clamping levers pivotally supported beside the winding shaft, free ends of the actuating elements cooperating with the pull rod and being pivotable out of a position in which they extend about parallel to that winding shaft into a position in which they extend about at a right angle to the winding shaft.

21. A roll-up window blind according to claim 13, further including two actuating elements comprising two toggle levers pivotally supported beside the winding shaft, respective ends of the toggle levers cooperating with the pull rod and being pivotable out of a position in which in a first position they extend about parallel to the winding shaft, into a second position in which they extend about at a right angle to the winding shaft.

* * * * *